US010338971B2

(12) United States Patent
Arigaya

(10) Patent No.: US 10,338,971 B2
(45) Date of Patent: Jul. 2, 2019

(54) INFORMATION PROCESSING APPARATUS, INFORMATION PROCESSING SYSTEM, INFORMATION PROCESSING METHOD, AND PROGRAM

(71) Applicant: Kazuhisa Arigaya, Tokyo (JP)

(72) Inventor: Kazuhisa Arigaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 301 days.

(21) Appl. No.: 15/067,433

(22) Filed: Mar. 11, 2016

(65) Prior Publication Data

US 2016/0277316 A1 Sep. 22, 2016

(30) Foreign Application Priority Data

Mar. 18, 2015 (JP) ................................. 2015-054676

(51) Int. Cl.
*G06F 9/50* (2006.01)
*G06F 11/07* (2006.01)

(52) U.S. Cl.
CPC ............ *G06F 9/5061* (2013.01); *G06F 11/07* (2013.01)

(58) Field of Classification Search
CPC .................................................... G06F 9/5061
USPC ......................................................... 709/226
See application file for complete search history.

(56) References Cited

U.S. PATENT DOCUMENTS

| | | | | |
|---|---|---|---|---|
| 5,889,772 A * | 3/1999 | Fischer | ................. | H04L 1/0007 370/346 |
| 7,184,945 B1 * | 2/2007 | Takahashi | ............. | G06F 9/5083 370/389 |
| 8,073,457 B2 * | 12/2011 | Lee | ......................... | H04L 47/11 455/450 |
| 2004/0123180 A1 * | 6/2004 | Soejima | .............. | G06F 11/1084 714/5.1 |
| 2004/0138856 A1 * | 7/2004 | Tai | .................... | G05B 19/41875 702/185 |
| 2007/0271434 A1 * | 11/2007 | Kawamura | ........... | G06F 3/0608 711/165 |

(Continued)

FOREIGN PATENT DOCUMENTS

| | | |
|---|---|---|
| JP | 2004-234262 | 8/2004 |
| JP | 5208324 | 6/2013 |

*Primary Examiner* — Ondrej C Vostal
(74) *Attorney, Agent, or Firm* — IPUSA, PLLC

(57) ABSTRACT

An information processing apparatus connected to computational resource groups including computational resources through a network includes a monitor unit monitoring a state of each computational resource belonging to each computational resource group; a specifying unit specifying the computational resource group, in which a ratio of the unusable computational resource is equal to or greater than a threshold, based on the state; and a selection unit selecting, in a case where the computational resource group is unspecified, an allocation destination of a request allocated to any one of the computational resource groups from among the computational resources belonging to the unspecified computational resource group, and in a case where the computational resource group is specified, an allocation destination of a request from among the usable computational resources belonging to the specified computational resource group and the computational resources belonging to the computational resource group other than the specified computational resource group.

20 Claims, 8 Drawing Sheets

(56) References Cited

U.S. PATENT DOCUMENTS

| | | | |
|---|---|---|---|
| 2008/0215718 A1* | 9/2008 | Stolorz | H04L 61/1511 709/223 |
| 2008/0229183 A1* | 9/2008 | Shimizu | G06F 17/3089 715/207 |
| 2008/0263390 A1* | 10/2008 | Baba | G06F 11/2028 714/4.1 |
| 2008/0313118 A1* | 12/2008 | Anerousis | G06F 11/0709 706/46 |
| 2009/0063509 A1* | 3/2009 | Lockhart | H04L 41/0681 |
| 2009/0172460 A1* | 7/2009 | Bobak | G06F 11/0709 714/2 |
| 2012/0243431 A1* | 9/2012 | Chen | H04W 72/0406 370/252 |
| 2013/0013522 A1* | 1/2013 | Thielges | G06Q 10/06 705/314 |
| 2015/0012622 A1 | 1/2015 | Omatsu | |
| 2015/0249589 A1* | 9/2015 | Xiong | H04L 69/40 707/748 |
| 2015/0355812 A1* | 12/2015 | Onishi | G06F 3/0416 715/762 |
| 2016/0143057 A1* | 5/2016 | Li | H04W 4/06 370/329 |
| 2016/0198394 A1* | 7/2016 | Heikkila | H04L 41/16 370/328 |

* cited by examiner

FIG.5

| CLUSTER ID | NODE ADMINISTRATION UNIT ID | APPLICATION ID | FAIL-OVER DESTINATION |
|---|---|---|---|
| CLUSTER 1 | NODE ADMINISTRATION UNIT 1 | SCAN SERVER | |
| CLUSTER 2 | NODE ADMINISTRATION UNIT 2 | PRINT SERVER SCAN SERVER | |
| : | : | : | |
| CLUSTER n | NODE ADMINISTRATION UNIT n | WEB SERVER | |

| NODE NAME | ADDRESS | STATE | BELONGING CLUSTER |
|---|---|---|---|
| NODE 11 | ... | FAILURE | CLUSTER 1 |
| NODE 12 | ... | LOAD 20% | CLUSTER 1 |
| : | : | : | |
| NODE 1n | ... | LOAD 40% | CLUSTER 1 |

| CLUSTER ID | NODE ADMINISTRATION UNIT ID | APPLICATION ID | FAIL-OVER DESTINATION |
|---|---|---|---|
| CLUSTER 1 | NODE ADMINISTRATION UNIT 1 | SCAN SERVER | CLUSTER 2 |
| CLUSTER 2 | NODE ADMINISTRATION UNIT 2 | PRINT SERVER SCAN SERVER | |
| ⋮ | | | |

| NODE NAME | ADDRESS | STATE | BELONGING CLUSTER |
|---|---|---|---|
| NODE 11 | ⋯ | FAILURE | CLUSTER 1 |
| NODE 12 | ⋯ | LOAD 20% | CLUSTER 1 |
| ⋮ | | | |

14-2

| NODE NAME | ADDRESS | STATE | BELONGING CLUSTER |
|---|---|---|---|
| NODE 21 | ⋯ | LOAD 50% | CLUSTER 2 |
| NODE 22 | ⋯ | LOAD 10% | CLUSTER 2 |
| NODE 12 | ⋯ | LOAD 20% | CLUSTER 1 |
| ⋮ | | | |

INFORMATION PROCESSING APPARATUS, INFORMATION PROCESSING SYSTEM, INFORMATION PROCESSING METHOD, AND PROGRAM

BACKGROUND OF THE INVENTION

1. Field of the Invention

The present invention relates to an information processing apparatus, an information processing system, an information processing method, and a program.

2. Description of the Related Art

In recent years, as a cluster structure of connecting multiple servers, there are known a load balance cluster performing a load distribution, a fail-over cluster of making a system redundant, or the like.

Patent Document 1: Japanese Patent No. 5208324

SUMMARY OF THE INVENTION

It is a general object of at least one embodiment of the present invention to provide an information processing apparatus that substantially obviates one or more problems caused by the limitations and disadvantages of the related art.

One aspect of the embodiments of the present invention may be to provide an information processing apparatus connected to a plurality of computational resource groups, each of which includes a plurality of computational resources, through a network including a monitor unit configured to monitor a state of each computational resource belonging to each computational resource group; a specifying unit configured to specify the computational resource group, in which a ratio of the unusable computational resource is equal to or greater than a threshold, based on the state of each computational resource monitored by the monitor unit; and a selection unit configured to select, in a case where the computational resource group is unspecified, an allocation destination of a request allocated to any one of the computational resource groups from among the computational resources belonging to the unspecified computational resource group, and in a case where the computational resource group is specified, an allocation destination of a request allocated to the specified computational resource group from among the usable computational resources belonging to the specified computational resource group and the computational resources belonging to the computational resource group other than the specified computational resource group.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 5 illustrates an exemplary structure of a cluster information memory unit.

FIG. 6 illustrates an exemplary structure of a node information memory unit.

FIGS. 8A and 8B illustrate an exemplary update of a cluster information memory unit and a node information memory unit at a time of the fail-over.

DETAILED DESCRIPTION OF THE PREFERRED EMBODIMENTS

However, in an example of the existing load balance cluster, a performance is substantially degraded when the number of nodes forming the cluster is greatly reduced by a failure.

Further, in the fail-over cluster, it is necessary to prepare a node for a standby system in addition to a node for an active system which is being operated. Therefore, there is a problem that a resource becomes useless while the normal operation is being done.

The present invention is provided in consideration of the above point. An object of the present invention is to make a computational resource efficiently usable.

A description is given below, with reference to the FIG. 1 through FIG. 9 of embodiments of the present invention. Where the same reference symbols are attached to the same parts, repeated description of the parts is omitted.

Reference symbols typically designate as follows:
1: information processing system;
10: administration server;
11: cluster administration unit;
12: node administration unit;
13: cluster information memory unit;
14: node information memory unit;
20: cluster;
21: gateway;
22: calculation node;
40: client apparatus;
100: drive device;
101: recording medium;
102: auxiliary memory device;
103: memory device;
104: CPU;
105: interface device; and
B: bus.

Figure 1:
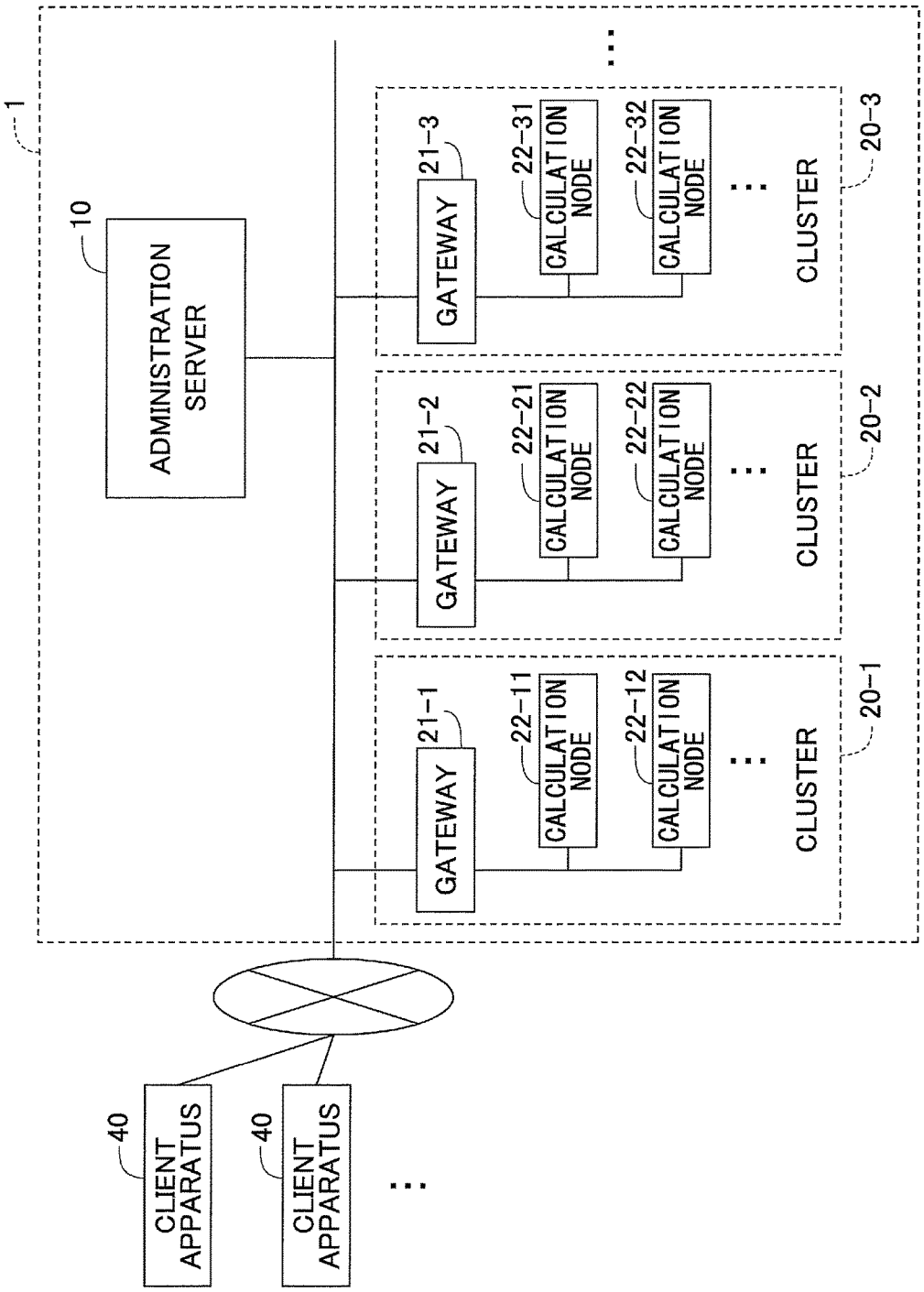
FIG. 1 illustrates an exemplary structure of an information processing system of an embodiment of the present invention.

Hereinafter, an embodiment of the present invention is described based on the figures. FIG. 1 illustrates an exemplary structure of an information processing system of the embodiment. Referring to FIG. 1, the information processing system 1 includes multiple clusters 20 such as clusters 20-1 to 20-$n$ (hereinafter, simply referred to as a "cluster 20" when the clusters 20-1 to 20-$n$ are not distinguished) and an administration server 10. The clusters 20 and the administration server 10 are connected through a network such as a Local Area Network (LAN) so as to be communicable.

Further, the clusters 20 are connected through a network such as the Local Area Network (LAN) so as to be mutually communicable. Further, the clusters 20 are connected through a network such as the LAN and the Internet to at least one client apparatus 40.

The client apparatus 40 is provided to send a request to the clusters 20. For example, a Personal Computer (PC), a smartphone, and a tablet terminal may be the client apparatus 40, and an image forming apparatus such as a multifunction peripheral, a printer, and a scanner may be the client apparatus 40. Another apparatus may be a client apparatus 40.

Each of the clusters 20 includes multiple calculation nodes 22 which are clustered to perform a load distribution. Thus, a load balance cluster is formed. Said differently, the calculation nodes 22 belonging to one of the clusters 20 can execute a process related to a common function common to these calculation nodes 22. However, different clusters 20 may not execute a common process. Within the embodiment, the clusters 20 basically belong to an active system.

Each calculation node 22 may function as, for example, a web server, a data base server, a print server, and a scan server. Each calculation node 22 may conduct a scientific and technologic operation. The print server is a computer spooling a print data sent from the client apparatus 40. The scan server is a computer storing an image data, which is read from an original manuscript by a client apparatus 40 as an image forming apparatus. However, each calculation node 22 is not necessarily a computer including a central processing unit (CPU), a main memory device, an auxiliary memory device, or the like. The calculation node 22 may be distinguished for each CPU or each CPU core.

Each cluster 20 includes one gateway 21. Each gateway 21 sends a request, which is received from the client apparatus 40 and is bound for the cluster, to which the gateway belongs. Each gateway 21 inquires of the administration server 10 about the calculation node 22 being an allocation destination of the received request.

Referring to FIG. 1, the reference symbols of the gateways 21 in the clusters 20 are affixed at these ends with branch numbers corresponding to branch numbers of the clusters 20, to which the corresponding gateways 21 belong, respectively. The tens place digit of the branch number in the reference symbol of each calculation node 22 is the same as the branch number of the reference symbol of the cluster, to which each calculation node 22 belongs. The one place digit of the branch number of the reference symbol of each calculation node is a number for distinguishing the calculation nodes 22 in the same cluster 20.

The administration server 10 is at least one computer which monitors a state of the calculation node 22 belonging to each cluster and selects the calculation node 22 at the allocation destination of the request from the client apparatus 40 to each cluster 20.

Figure 2:
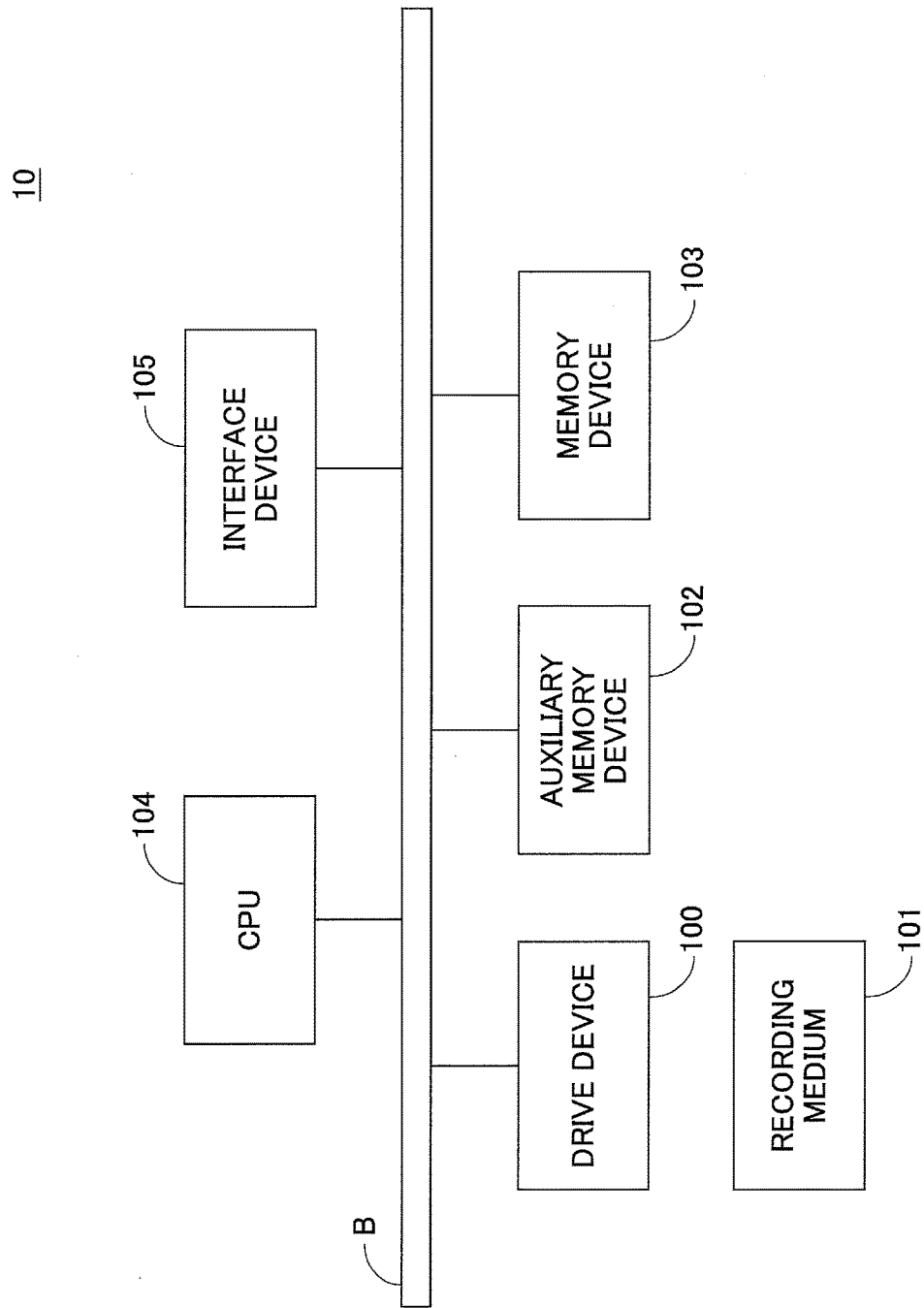
FIG. 2 illustrates an exemplary hardware structure of an administration server according to the embodiment of the present invention.

FIG. 2 illustrates an exemplary hardware configuration of the administration server according to the embodiment of the present invention. The administration server 10 illustrated in FIG. 2 includes a drive device 100, an auxiliary memory device 102, a memory device 103, a CPU 104, and an interface device 105, and so on, which are mutually connected by a bus B.

A program substantializing processes in the administration server 10 is supplied by the recording medium 101 such as a CD-ROM. When the recording medium 101 having the program recorded in it is set into the drive device 100, the program is installed on the auxiliary memory device 102 through the drive device 100 from the recording medium 101. However, the program may not always be installed from the recording medium 101 and may be downloaded from another computer through the network. The auxiliary memory device 102 stores necessary files, data, and so on in addition to the installed program.

The memory device 103 reads out the program from the auxiliary memory device 102 when the program is instructed to be invoked and stores the read program into the memory device 203. The CPU 104 performs a function related to the administration server 10 in conformity with the program stored in the memory device 103. The interface device 105 is used as an interface for connecting to the network.

Figure 3:
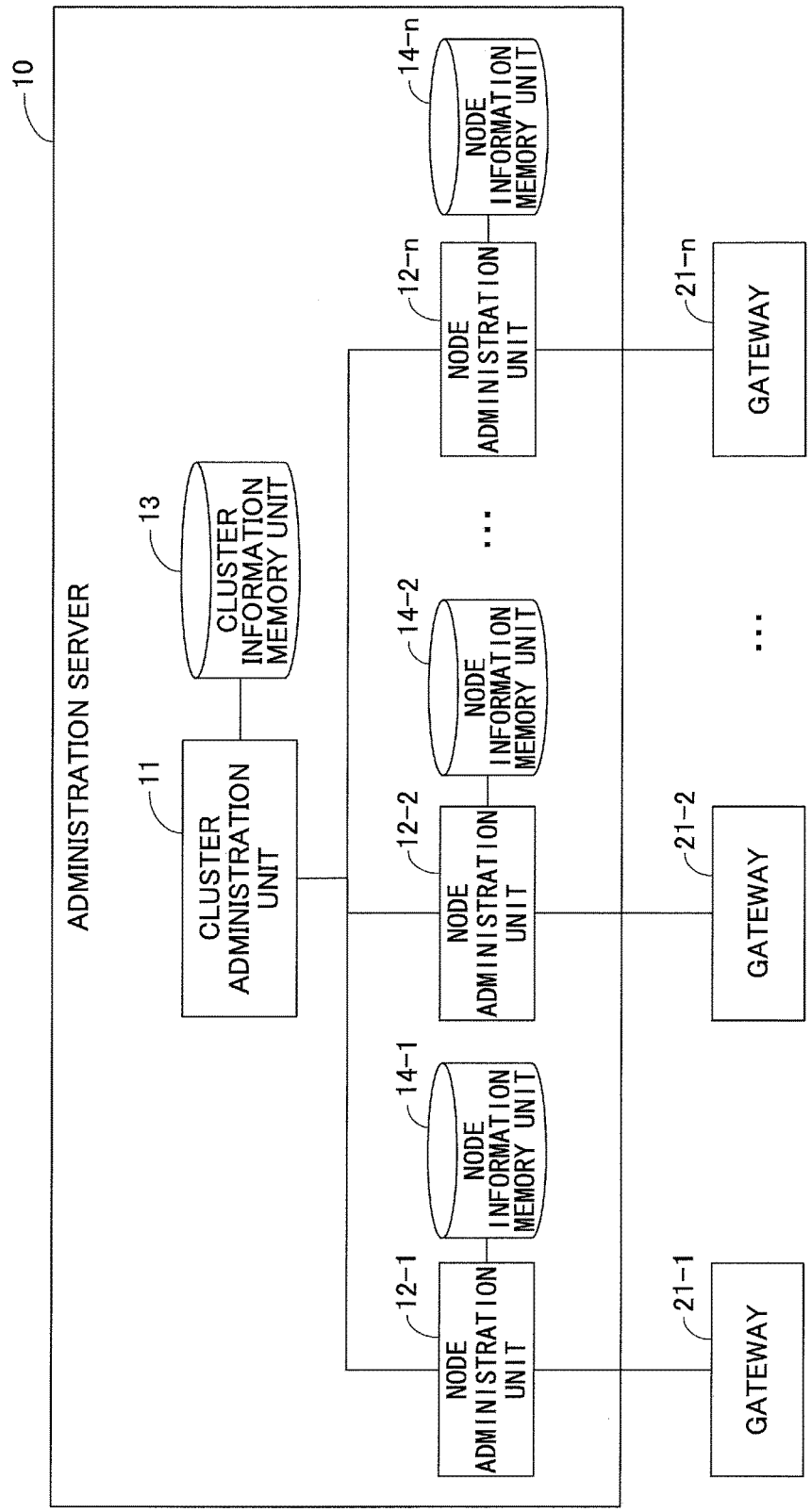
FIG. 3 illustrates an exemplary functional structure of the administration server according to the embodiment of the present invention.

FIG. 3 illustrates an exemplary functional structure of the administration server according to the embodiment of the present invention. Referring to FIG. 3, the administration server 10 includes a cluster administration unit 11, a node administration unit 12 for each cluster 20, and so on. These parts are substantialized when one or more programs installed on the administration server 10 are executed by the CPU 104. The administration server 10 uses a cluster information memory unit 13 and a node information memory unit for each cluster 20. The cluster information memory unit 13 and the node information memory unit 14 are substantialized by the auxiliary memory device 102, a memory device connectable to the administration server 10 through a network, or the like.

The node administration unit 12 monitors a state (a load state, an existence or a nonexistence of a failure (e.g., an availability or a unavailability of use)) of the calculation nodes 22 belonging to the corresponding cluster 20, and stores information indicative of the states of the calculation node 22 in the node information memory unit 14. The node information memory unit 14 stores identification information of each calculation node 22 belonging to each cluster, information indicative of the state of each calculation node 22, and so on. The node administration unit 12 selects the calculation node 22 at the allocation destination of the request to the cluster 22 corresponding to the node administration unit 12 based on the information stored in the node information memory unit 14. Here, the reference symbols of the node administration units and the reference symbols of the node information memory units 14 are affixed with branch numbers of corresponding clusters, respectively.

The cluster administration unit 11 controls a fail-over or a fail-back between the clusters 20 based on the information stored in the node information memory unit 14.

Figure 4:
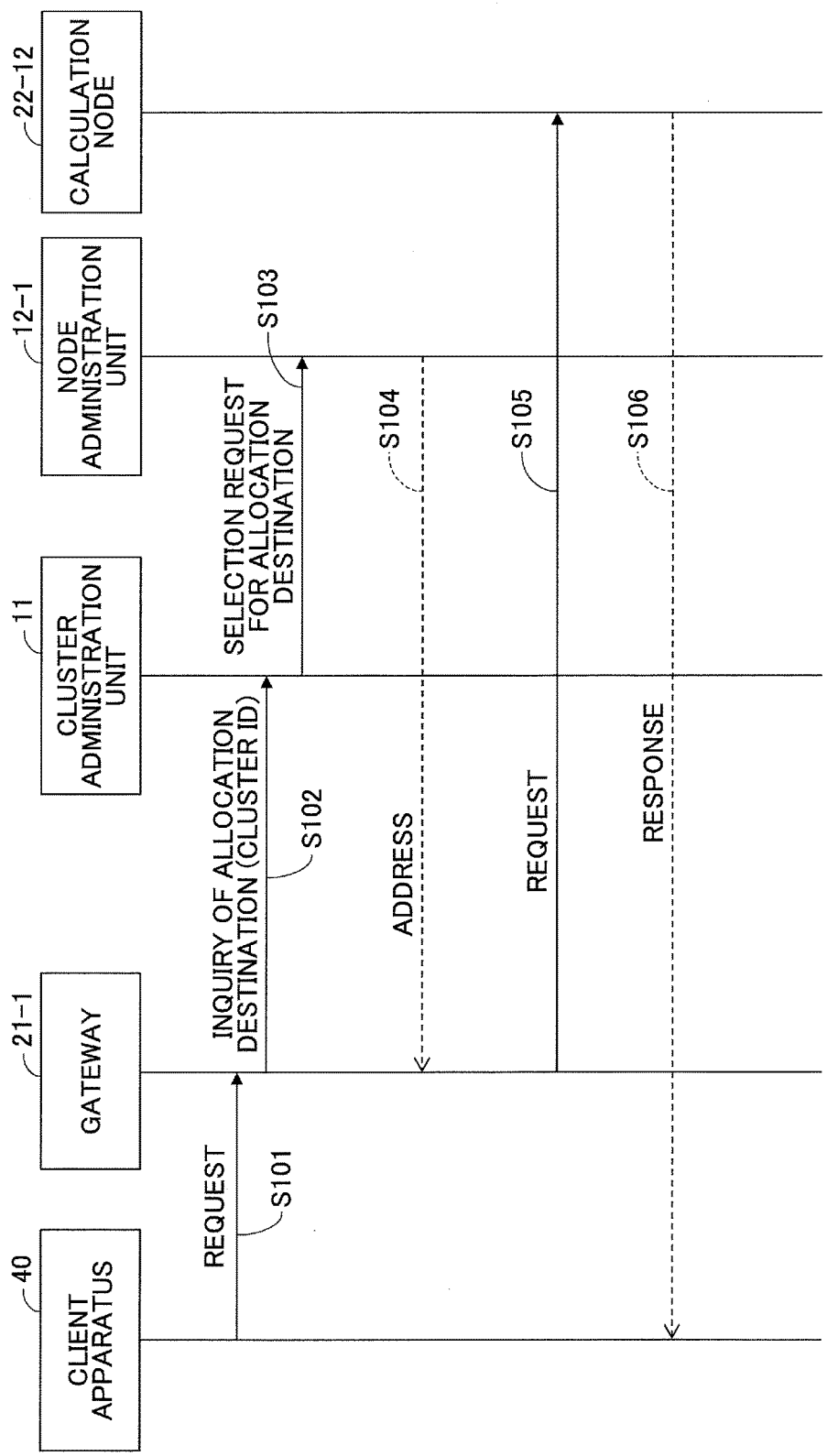
FIG. 4 is a sequence chart for explaining an exemplary process performed in response to a request sent to any one of clusters.

Hereinafter, the procedure performed by the information processing system 1 is described. FIG. 4 is a sequence chart for explaining an exemplary process performed in response to a request sent to any one of clusters.

In step S101, when the client apparatus 40 sends a request to the cluster 20-1, this request (hereinafter, referred to as a "target request") is received by a gateway 21-1. The gateway 21-1 inquires of the administration server 10 about to which calculation node 22 the target request is allocated (which calculation node 22 is used for the target request) by designating the cluster ID of the cluster 20-1 (S102). The cluster ID is identification information for each cluster 20.

The cluster administration unit 11 specifies the node administration unit 12 corresponding to the cluster ID designated in the inquiry by referring to the cluster information memory unit 13.

FIG. 5 illustrates an exemplary structure of the cluster information memory unit 13. Referring to FIG. 5, the cluster information memory unit 13 stores values of items such as a cluster ID, a node administration unit ID, an application ID, and a fail-over destination for each cluster 20.

The cluster ID is as illustrated in the above. Within this embodiment, the cluster ID has a format of "cluster <branch number of reference symbol of corresponding cluster 209>". For example, "cluster 1" is the cluster ID of the cluster 20-1. The node administration unit ID is identification information of the node administration unit 12 corresponding to the cluster 20 corresponding to the cluster ID. The application ID is the identification information of the application implemented in the cluster 20 corresponding to the cluster ID. The application ID may be information indicative of a process which can be executed by the cluster corresponding to the cluster ID. In a case where the cluster 20 corresponding to the cluster ID is subjected to the fail-over toward another cluster 20, the fail-over destination is an item, in which the cluster ID of the other cluster 20 is recorded.

A record is registered into the cluster administration unit 11 by the cluster administration unit 11 in response to, for example, an input of an instruction of newly creating the cluster 20 by an administrator. At this time, the cluster ID may be automatically created by the cluster administration unit 11. The application ID is input along with the instruction of newly creating the cluster 20 by the administrator. The cluster administration unit 11 creates the node administration unit 12 and registers the node administration unit ID corresponding to the node administration unit 12 into a record corresponding to the cluster 20. Here, the node administration unit 12 may be, for example, a process or a thread. In this case, the node administration unit ID may be a process ID or a thread ID.

Referring back to FIG. 4, the cluster administration unit 11 receiving the inquiry in step S102 specifies the node administration unit ID corresponding to the cluster ID designated in the inquiry, and requests the node administration unit 12 corresponding to this node administration unit ID to select the allocation destination of the target request (S103). Here, it is requested to select the allocation destination of the target request to the node administration unit 12-1 corresponding to the cluster 20-1.

The node administration unit 12-1 refers to the node information memory unit 14-1 in response to the request and selects the calculation node 22 at the allocation destination of the target request.

FIG. 6 illustrates an exemplary structure of a node information memory unit. Referring to FIG. 6, the node information memory unit 14 stores values of items such as the node name, the address, the state, the belonging cluster, and so on for each calculation node 22 belonging to the corresponding cluster 20.

The node name is for each calculation node 22. Within the embodiment, the node name has a format of "node <branch number of reference symbol of corresponding calculation node 22>". For example, "node 11" is the node name of the calculation node 22-11. The address is an address (e.g., an IP address) for communication of the calculation node 22. The state is information indicative of a load state of the calculation node 22 or an existence or a nonexistence of a failure (an availability or a unavailability of use) of the calculation node 22. The belonging cluster is a cluster ID of the cluster 20, to which the calculation node 22 belongs.

Each record of the node information memory unit 14 is registered by, for example, the administrator. However, the state is acquired and updated when the node administration unit 12 monitors the calculation nodes 22 belonging to the cluster 20 corresponding to the node administration unit 12. The state of the calculation node 22 is monitored in use of the known art. For example, the node administration unit 12 may periodically inquire of each calculation node 22 about the state.

The node administration unit 12-1 selects the calculation node 22, for which the value of the state is not the "failure" and the value of the load indicated by the state is the minimum among the records stored in the node information memory unit 14-1, as the allocation destination of the target request. In the example of FIG. 6, the calculation node 22-12 whose node name is "node 12" is selected. However, the calculation node 22, in which an average value or the like of the load during a predetermined period back to the current time is the minimum, may be selected as the allocation destination of the target request. The allocation destination of the target request may be selected by another method. The "failure" is a state where the function of the calculation node 22 cannot be normally executed. For example, in a case where a communication with the calculation node 22 is impossible, the calculation node 22 may be determined to be in a failure. Alternatively, in a case where any alarm is generated in the calculation node 22, the calculation node 22 may be determined to be in the failure.

Subsequently, the node administration unit 12-1 reports the address of the calculation node 22-12, which is selected as the allocation destination, to the gateway 21-1 (S104). The gateway 21-1 transfers the target request to the address (S105). The calculation node 22-12 executes a process corresponding to the target request and returns a response including the processing result to the client apparatus 40 (S106).

Described next is control processes of the fail-over and the fail-back between the clusters 20.

Figure 7:
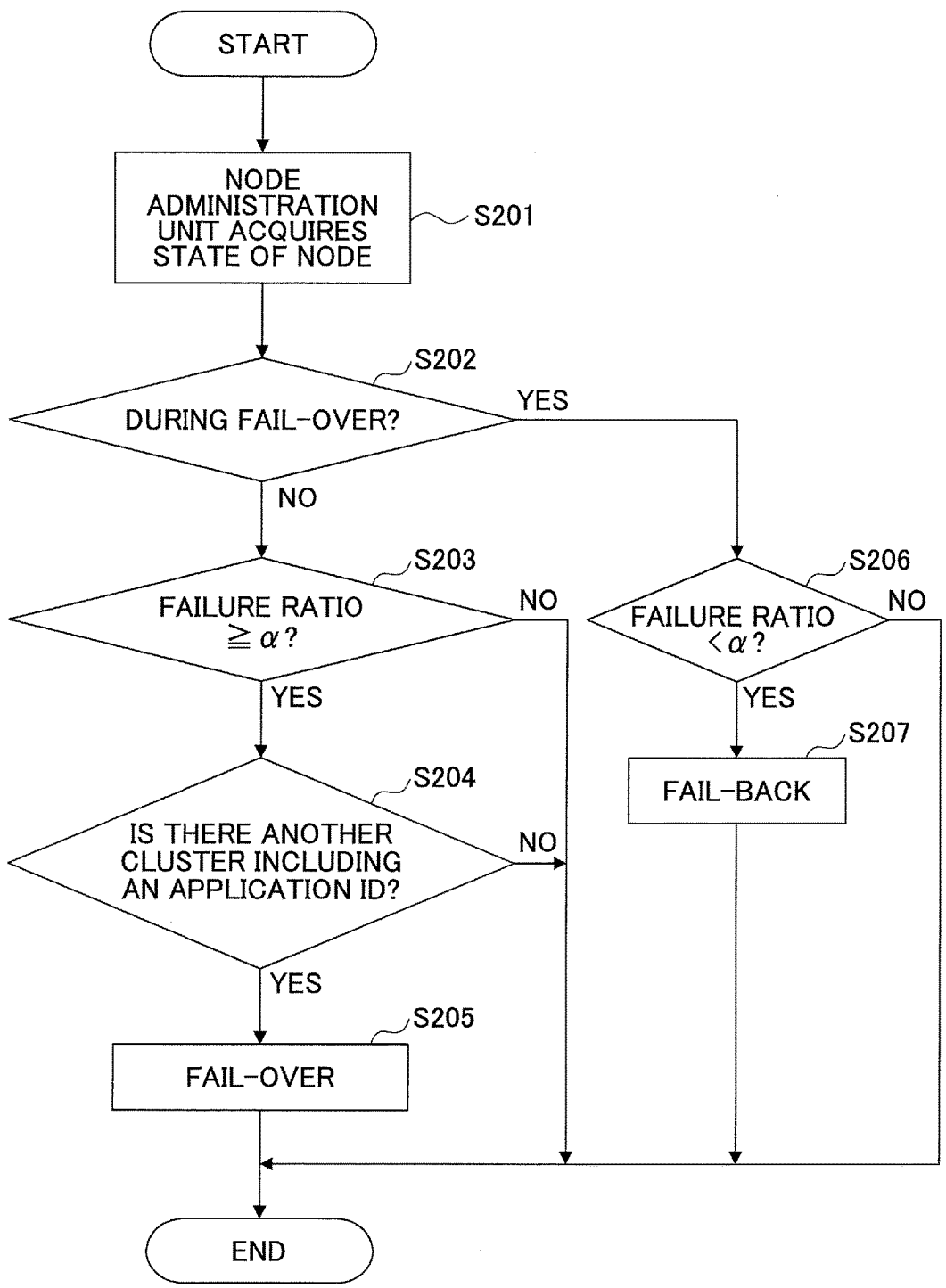
FIG. 7 is a flowchart for explaining an exemplary procedure of a control process of a fail-over and a fail-back between clusters.

FIG. 7 is a flowchart for explaining an exemplary procedure of a control process of the fail-over and the fail-back between the clusters. The process illustrated in FIG. 7 is executed every time when the node administration unit 12 acquires the states of the calculation nodes 22 and the node information memory unit 14 is updated, for example. The timings of periodic acquisitions of the states by different node administration units 12 are not necessarily the same. Therefore, the procedure illustrated in FIG. 7 may be executed at mutually different timings for each clusters 20.

In step S201, when any one of the node administration units 12 acquires the states of the calculation nodes 22 belonging to the cluster 20 corresponding to the node administration unit 12 and updates the value of the state of the node information memory unit 14 corresponding to the node administration unit 12, the node administration unit 12 reports the cluster ID of the cluster 20 and information (hereinafter, referred to as "node information") stored in the node information memory unit 14 to the cluster administration unit 11. Step S202 and subsequent steps may be executed only in a case where the number of the calculation nodes 22 whose values of the states are "failure" in the node information memory unit 14 changes.

Subsequently, the cluster administration unit 11 determines whether the cluster 20 (hereinafter, referred to as a "target cluster") corresponding to the reported cluster ID is subjected to the fail-over to another cluster 20 (S202). This determination can be done based on whether a fail-over destination for the target cluster 20 is stored in the cluster information memory unit 14. If the cluster information memory unit 14 stores the fail-over destination, the target cluster 20 is being subjected to the fail-over.

If the target cluster 20 is not being subjected to fail-over (NO in S202), the cluster administration unit 11 determines whether a failure ratio of the target cluster 20 is equal to or is greater than a threshold α based on the reported node information (S203). The failure ratio of the cluster 20 is a ratio of the number of the calculation nodes 22 whose states are "failure" relative to the total number of the calculation nodes 22 belonging to the cluster 20.

In a case where the failure ratio of the target cluster 20 is equal to or greater than the threshold α (i.e., in a case where the target cluster 20 is specified as a cluster 20 having the failure ratio equal to or greater than the threshold α) (YES in S203), the cluster administration unit 11 determines whether there is another cluster 20 corresponding to the application IDs including all application IDs corresponding to the target cluster 20 with reference to the cluster information memory unit 13 (S204).

If there is another cluster 20 corresponding to the application IDs including all application IDs corresponding to the target cluster (YES in S204), the cluster administration unit 11 performs the fail-over from the target cluster 20 to the other cluster 20 (S204). Specifically, the cluster administration unit 11 causes the cluster information memory unit 13 to store the cluster ID of the other cluster 20 in the fail-over destination, which corresponds to the target cluster 20, of the record. Further, the cluster administration unit 11 requests the node administration unit 12 corresponding to the other cluster 20 to add a record whose state is not the "failure" among the node information, which relates to the target cluster 20 and is reported in step S201. Said differently, the usable calculation node 22 in the target cluster 20 is included in the other cluster 20 at the fail-over destination. Thus, it is possible to reduce the increase of the load of the cluster 20 at the fail-over destination.

For example, when the fail-over from the cluster 20-1 to the cluster 20-2 is performed, the cluster information memory unit 13, the node information memory unit 14-1, and the node information memory unit 14-2 are updated as illustrated in FIGS. 8A and 8B.

FIGS. 8A and 8B illustrate an exemplary update of the cluster information memory unit and the node information memory unit at a time of the fail-over. Referring to FIG. 8A, the cluster ID of the cluster 20-2 is recorded in the fail-over destination of the record corresponding to the cluster 201.

Referring to FIG. 8B, the record whose state is not the "failure" in the node information memory unit 14-1 corresponding to the cluster 20 at the fail-over source is copied to the node information memory unit 14-2 corresponding to the cluster 20 at the fail-over destination. At this time, a value of the belonging cluster of the record at the copy destination is not changed.

In a case where the target cluster 20 at the fail-over source has a shared disk, data in the shared disk is copied to a shared disk in the cluster 20 at the fail-over destination.

If the target cluster 20 is being subjected to the fail-over (YES in S202), the cluster administration unit 11 determines whether the failure ratio of the target cluster 20 is recovered to be smaller than the threshold α based on the reported node information (S206). The denominator of the failure ratio is the total number of the calculation nodes 22 inherently belonging to the target cluster 20. Said differently, the number of the calculation nodes 22 moved to the other cluster 20 by the fail-over is included in the total number. The number of the numerator is the number of the calculation nodes 22 whose state is the "failure" among the calculation nodes 22 inherently belonging to the target cluster 20.

If the failure ratio of the target cluster 20 is smaller than the threshold α (i.e., in a case where the target cluster 20 is no more specified as the cluster 20 having the failure ratio equal to or greater than the threshold α) (YES in S206), the cluster administration unit 11 executes the fail-back for the target cluster 20 (S207).

Specifically, the cluster administration unit 11 causes the cluster information memory unit 13 to delete the record, whose value of the belonging cluster is the cluster ID of the target cluster 20, from the node information memory unit 14 corresponding to the cluster 20 at the fail-over destination, whose cluster ID is recorded in the fail-over destination of the record corresponding to the target cluster 20. The cluster administration unit 11 deletes the value of the fail-over destination of the record corresponding to the target cluster 20 from the cluster information memory unit 13.

Described next is a procedure executed in a case where the request from the client apparatus 40 is received by the cluster 20-1 during a period of the fail-over from the cluster 20-1 to the cluster 20-2.

Figure 9:
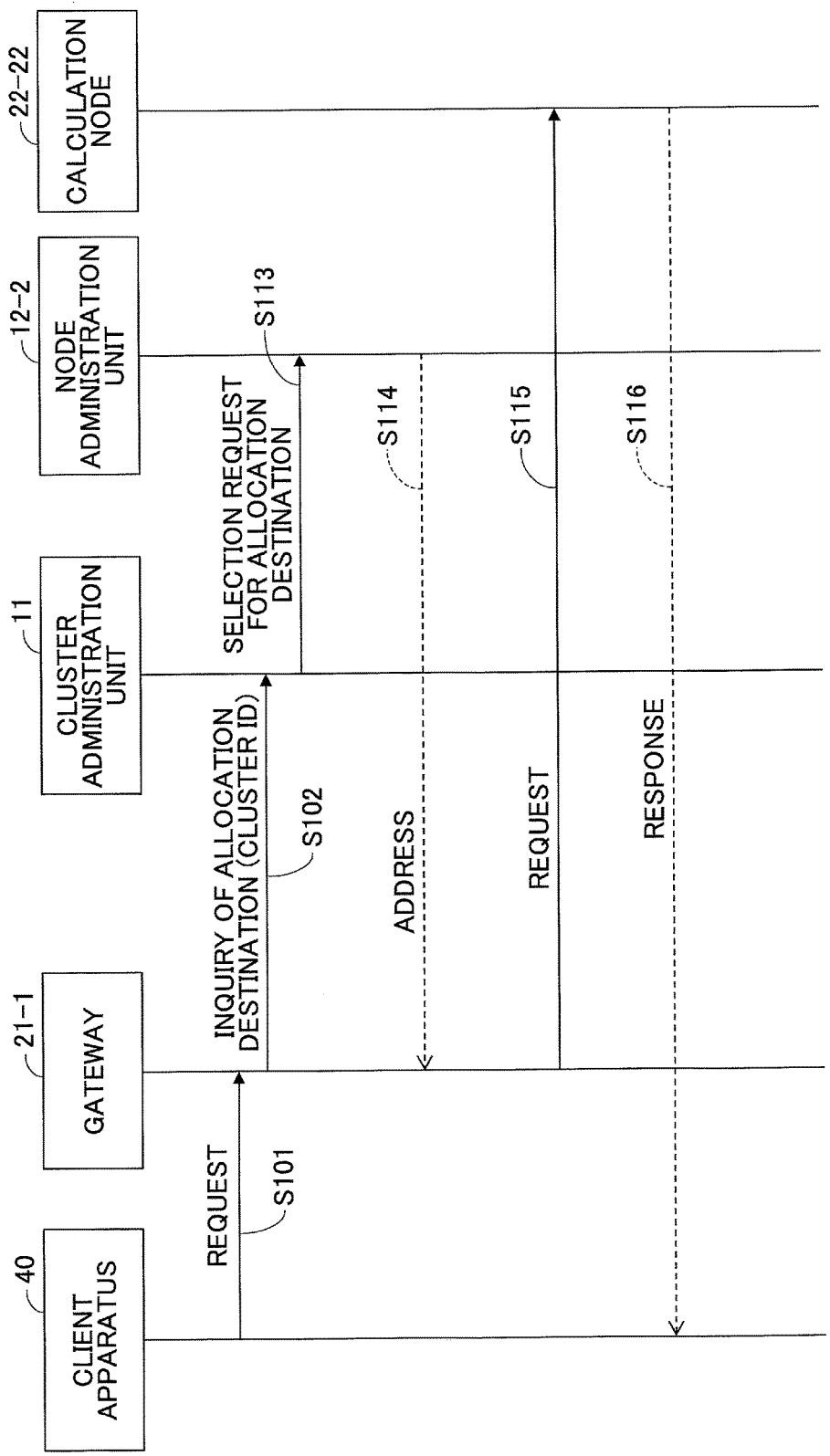
FIG. 9 is a sequence chart for explaining an exemplary process performed in response to a request for a cluster of a fail-over source.

FIG. 9 is a sequence chart for explaining an exemplary process performed in response to the request for the cluster of the fail-over source. Referring to FIG. 9, the same reference symbols as those in FIG. 4 are given to the corresponding steps, and explanation of these steps is omitted. Referring to FIG. 9, the cluster information memory unit 13, the node information memory unit 14-1, and the node information memory unit 14-2 are in the state illustrated in FIGS. 8A and 8B.

In response to the inquiry in step S102, the cluster administration unit 11 requests the node administration unit 12-2 corresponding to the cluster 20-2 to select the allocation destination of the target request (S203) because the cluster ID of the cluster 20-2 is recorded in the fail-over destination of the record corresponding to the cluster ID designated in the inquiry with reference to the cluster information memory unit 13.

The node administration unit 12-2 refers to the node information memory unit 14-2 in response to the request and selects the calculation node 22 at the allocation destination of the target request. The node administration unit 12-2 selects the calculation node 22, for which the value of the state is not the "failure" and the value of the load indicated by the state is the minimum among the records stored in the node information memory unit 14-2, as the allocation destination of the target request. Here, the node information memory unit 14-2 is the state illustrated in FIG. 8B. Therefore, the node administration unit 12-2 selects the allocation destination of the target request from an aggregate including not only the calculation nodes 22 belonging to the cluster 20-2 but also the calculation nodes 22-12 belonging to the cluster 20-1. Here, the calculation node 22-22 whose node name is "node 22" is selected. If the load of the calculation node 22-12 is the minimum, the calculation node 22-12 is selected.

Subsequently, the node administration unit 12-2 reports the address of the calculation node 22-22, which is selected as the allocation destination, to the gateway 21-1 (S114). The gateway 21-1 transfers the target request to the address (S115). The calculation node 22-22 executes a process corresponding to the target request and returns a response including the processing result to the client apparatus 40 (S116). In this case, the client apparatus 40 can use the cluster 20 which is different from the cluster 20-1 being the transmission source of the request without changing the transmission destination of the request.

Regarding the cluster 20-1, in a case where the request is received by the cluster 20-1 after the fail-back is executed, the procedure described in FIG. 4 is executed.

As described above, within the embodiment, the multiple load balance clusters 20 are formed. In a case where the fail-over is done in a unit of the cluster 20, the cluster 20 at the fail-over destination can use a part of a computational resource of the load balance cluster 20 at the fail-over source. As a result, the computational resource can be efficiently used. Therefore, it is possible to prevent the performance of the cluster 20 at the fail-over destination from dropping, for example.

Within the embodiment, the administration server 10 is an example of the information processing apparatus. An aggregate of the node administration units 12 is an example of the monitor unit or a selection unit. The cluster administration unit 11 is an example of a specifying unit. The cluster 20 is an example of a computational resource group. The calculation node 22 is an example of a computational resource.

According to the embodiment, the computational resource can be effectively used.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2015-054676, filed on Mar. 18, 2015, the entire contents of which are incorporated herein by reference.

What is claimed is:

1. An information processing apparatus connected to a plurality of computational resource groups, each group including a plurality of computational resources, through a network, the information processing apparatus comprising:
   a processor; and
   a memory storing program instructions that cause the processor to:
      monitor a state of each computational resource belonging to each computational resource group;
      identify an unavailable computational resource group, in which a ratio of unusable computational resources to total computational resources is equal to or greater than a threshold, from among the plurality of computational resource groups, the identifying being based on the state of each computational resource monitored by the monitor unit; and
      receive a target request that includes an allocation destination designating a computational resource from among the plurality of computational resources to execute a requested process, wherein
         in a case where the computational resource designated by the allocation destination of the target request is a usable computational resource included within the computational resource group identified as the unavailable computational resource group, the target request is sent to the computational resource designated by the allocation destination, and
         in a case where the computational resource designated by the allocation destination of the target request is an unusable computational resource included within the computational resource group identified as the unavailable computational resource group, the target request is sent to one or more usable computational resources belonging to a computational resource group other than the unavailable computational resource group.

2. The information processing apparatus according to claim 1,
   wherein the plurality of computational resource groups include the computational resource groups, which have mutually different executable processes,
   wherein the processor selects,
      in a case where the computational resource group is specified by the specifying unit, the allocation destination of the request allocated to the specified computational resource group from among the usable computational resources belonging to the specified computational resource group and the computational resources belonging to the computational resource groups, which are other than the specified computational resource group and can execute a same process as in the specified computational resource group.

3. The information processing apparatus according to claim 1,
   wherein the processor selects,
      in a case where the computational resource group is specified by the specifying unit and thereafter the specified computational resource group is unspecified by the specifying unit, the allocation destination of the request allocated to the unspecified computational resource group from among the computational resources belonging to the unspecified computational resource group.

4. The information processing apparatus according to claim 2,
   wherein the processor selects,
      in a case where the computational resource group is specified by the specifying unit and thereafter the specified computational resource group is unspecified by the specifying unit, the allocation destination of the request allocated to the specified computational resource group from among the computational resources belonging to the specified computational resource group.

5. The information processing apparatus according to claim 1,
   wherein the processor selects the computational resource so as to minimize a load of the computational resource monitored by the monitor unit.

6. The information processing apparatus according to claim 2,
wherein the processor selects the computational resource so as to minimize a load of the computational resource monitored by the monitor unit.

7. The information processing apparatus according to claim 3,
wherein the processor selects the computational resource so as to minimize a load of the computational resource monitored by the monitor unit.

8. A method of processing information performed by an information processing apparatus connected to a plurality of computational resource groups, each group including a plurality of computational resources, through a network, the information processing method comprising:
monitoring a state of each computational resource belonging to each computational resource group;
identifying an unavailable computational resource group, in which a ratio of unusable computational resources to total computational resources is equal to or greater than a threshold, from among the plurality of computational resource groups, the identifying being based on the state of each computational resource monitored by the monitoring; and
receiving a target request that includes an allocation destination designating a computational resource from among the plurality of computational resources to execute a requested process, wherein
in a case where the computational resource designated by the allocation destination of the target request is a usable computational resource included within the computational resource group identified as the unavailable computational resource group, the target request is sent to the computational resource designated by the allocation destination, and
in a case where the computational resource designated by the allocation destination of the target request is an unusable computational resource included within the computational resource group identified as the unavailable computational resource group, the target request is sent to one or more usable computational resources belonging to a computational resource group other than the unavailable computational resource group.

9. The information processing method according to claim 8,
wherein the plurality of computational resource groups include the computational resource groups, which have mutually different executable processes,
wherein the selecting selects,
in a case where the computational resource group is specified by the specifying, the allocation destination of the request allocated to the specified computational resource group from among the usable computational resources belonging to the specified computational resource group and the computational resources belonging to the computational resource groups, which are other than the specified computational resource group and can execute a same process as in the specified computational resource group.

10. The information processing method according to claim 8,
wherein the selecting selects,
in a case where the computational resource group is specified by the specifying and thereafter the specified computational resource group is unspecified by the specifying, the allocation destination of the request allocated to the unspecified computational resource group from among the computational resources belonging to the unspecified computational resource group.

11. The information processing method according to claim 9,
wherein the selecting selects,
in a case where the computational resource group is specified by the specifying and thereafter the specified computational resource group is unspecified by the specifying, the allocation destination of the request allocated to the unspecified computational resource group from among the computational resources belonging to the unspecified computational resource group.

12. The information processing method according to claim 8,
wherein the selecting selects the computational resource so as to minimize a load of the computational resource monitored by the monitoring.

13. The information processing method according to claim 9,
wherein the selecting selects the computational resource so as to minimize a load of the computational resource monitored by the monitoring.

14. The information processing method according to claim 10,
wherein the selecting selects the computational resource so as to minimize a load of the computational resource monitored by the monitoring.

15. A non-transitory computer-readable storage medium storing a program for causing a computer included in an information processing apparatus connected to a plurality of computational resource groups, each group including a plurality of computational resources, through a network to execute an information processing method of processing information, the information processing method comprising:
monitoring a state of each computational resource belonging to each computational resource group;
identifying an unavailable computational resource group, in which a ratio of unusable computational resources to total computational resources is equal to or greater than a threshold, from among the plurality of computational resource groups, the identifying being based on the state of each computational resource monitored by the monitoring; and
receiving a target request that includes an allocation destination designating a computational resource from among the plurality of computational resources to execute a requested process, wherein
in a case where the computational resource designated by the allocation destination of the target request is a usable computational resource included within the computational resource group identified as the unavailable computational resource group, the target request is sent to the computational resource designated by the allocation destination, and
in a case where the computational resource designated by the allocation destination of the target request is an unusable computational resource included within the computational resource group identified as the unavailable computational resource group, the target request is sent to one or more usable computational resources belonging to a computational resource group other than the unavailable computational resource group.

16. The non-transitory computer-readable storage medium according to claim 15,
- wherein the plurality of computational resource groups include the computational resource groups, which have mutually different executable processes,
- wherein the selecting selects,
  - in a case where the computational resource group is specified by the specifying, the allocation destination of the request allocated to the specified computational resource group from among the usable computational resources belonging to the specified computational resource group and the computational resources belonging to the computational resource groups, which are other than the specified computational resource group and can execute a same process as in the specified computational resource group.

17. The non-transitory computer-readable storage medium according to claim 15,
- wherein the selecting selects,
  - in a case where the computational resource group is specified by the specifying and thereafter the specified computational resource group is unspecified by the specifying, the allocation destination of the request allocated to the unspecified computational resource group from among the computational resources belonging to the unspecified computational resource group.

18. The non-transitory computer-readable storage medium according to claim 16,
- wherein the selecting selects,
  - in a case where the computational resource group is specified by the specifying and thereafter the specified computational resource group is unspecified by the specifying, the allocation destination of the request allocated to the unspecified computational resource group from among the computational resources belonging to the unspecified computational resource group.

19. The non-transitory computer-readable storage medium according to claim 15,
- wherein the selecting selects the computational resource so as to minimize a load of the computational resource monitored by the monitoring.

20. The non-transitory computer-readable storage medium according to claim 16,
- wherein the selecting selects the computational resource so as to minimize a load of the computational resource monitored by the monitoring.

* * * * *